(12) United States Patent
Brandl

(10) Patent No.: US 7,299,564 B2
(45) Date of Patent: Nov. 27, 2007

(54) SCANNING UNIT AND POSITION MEASURING DEVICE

(75) Inventor: Sebastian Brandl, Altenmarkt (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 11/211,831

(22) Filed: Aug. 25, 2005

(65) Prior Publication Data
US 2006/0064890 A1   Mar. 30, 2006

(30) Foreign Application Priority Data
Sep. 30, 2004   (DE) .................. 10 2004 047 458

(51) Int. Cl.
*G01D 5/347* (2006.01)
(52) U.S. Cl. .......................... 33/707; 33/395
(58) Field of Classification Search ................. 33/706, 33/707, 708; 356/395
See application file for complete search history.

(56) References Cited

U.S. PATENT DOCUMENTS 2,451,972 A * 10/1948 Powers ....................... 356/395
2,886,717 A * 5/1959 Williamson et al. ........ 356/619
3,816,002 A   6/1974 Wieg .......................... 356/395
4,273,447 A   6/1981 Nelle .......................... 356/619
4,972,599 A   11/1990 Ernst ........................... 33/706
6,002,126 A * 12/1999 Feichtinger ............ 250/231.13
6,622,391 B1   9/2003 Shirai et al. .................. 33/292
7,185,444 B2 * 3/2007 Falkinger et al. ............ 33/707
2002/0108259 A1   8/2002 Feichtinger ................. 33/1 PT
2002/0144422 A1   10/2002 Suhara et al. ................ 33/613
2003/0172538 A1 * 9/2003 Tondorf ....................... 33/706
2006/0021242 A1 * 2/2006 Boge et al. ................... 33/706

FOREIGN PATENT DOCUMENTS

| DE | 1 040 268 | 10/1958 |
| DE | 36 37 126 A1 | 8/1987 |
| DE | 39 15 679 A1 | 11/1990 |

\* cited by examiner

*Primary Examiner*—Alexander R. Smith
(74) *Attorney, Agent, or Firm*—Brinks Hofer Gilson & Lione

(57) ABSTRACT

A scanning unit including a support and a scanning plate fastened on the support by a first fastening element and a second fastening element. An eccentric element that can be rotated around a first axis of rotation and causes pivoting of the scanning plate with respect to the support around a second axis of rotation, wherein the first axis of rotation is constituted by the first element and said second axis of rotation is constituted by the second fastening element.

8 Claims, 3 Drawing Sheets

SCANNING UNIT AND POSITION MEASURING DEVICE

Applicant claims, under 35 U.S.C. § 119, the benefit of priority of the filing date of Sep. 30, 2004 of a German patent application, copy attached, Serial Number 10 2004 047 458.3, filed on the aforementioned date, the entire contents of which is incorporated herein by reference.

BACKGROUND OF THE INVENTION

1. Technical Field

The present invention relates to a scanning unit with a scanning plate and an eccentric element, and to a position measuring device with a graduation support, which supports a measuring graduation, and a scanning unit for scanning the measuring graduation.

2. Discussion of Related Art

Scanning units and position measuring devices of this type are employed for measuring distances or angles in production machinery in the field of mechanical engineering, as well as increasingly in the semiconductor industry. Increasingly high demands are made on the position measuring devices. In order to optimize the scanning signals, it is necessary to align the scanning plate so that it matches the measuring graduation of the graduation support. In the process the scanning plate is pivoted in a plane around an axis of rotation. In connection with a linear measuring device, this plane is arranged parallel with respect to the plane of the scale surface to which the measuring graduation has been applied. This alignment is called Moiré adjustment.

A Moiré adjustment is known from DE 39 15 679 A1. Here, the scanning unit is fastened by several screws on a fastening elbow. In addition, an eccentric element is rotatably seated in this fastening elbow for the Moiré adjustment. The scanning unit is pivoted around a pin by rotating the eccentric element.

This arrangement has the disadvantage that separate adjusting elements must be provided in addition to the screws. Moreover, radial play must be provided for each screw in order to permit the degree of freedom in the course of pivoting.

BRIEF SUMMARY

An object of the present invention is based on disclosing a scanning unit and a position measuring device, in which the adjusting elements are arranged in a space-saving manner and wherein an exact and simple adjustment of the Moiré angle is made possible.

This object is attained by a scanning unit including a support and a scanning plate fastened on the support by a first fastening element and a second fastening element. An eccentric element that can be rotated around a first axis of rotation and causes pivoting of the scanning plate with respect to the support around a second axis of rotation, wherein the first axis of rotation is constituted by the first element and said second axis of rotation is constituted by the second fastening element.

This object is also attained by a position measuring device that includes a graduation support supporting a measuring graduation and a scanning unit for scanning the measuring graduation. The scanning unit including a support and a scanning plate fastened on the support by a first fastening element and a second fastening element. An eccentric element that can be rotated around a first axis of rotation and causes pivoting of the scanning plate with respect to the support around a second axis of rotation, wherein the first axis of rotation is constituted by the first element and said second axis of rotation is constituted by the second fastening element.

An advantage of the arrangement in accordance with the present invention lies in that, besides the fastening element, only one eccentric bushing, which is arranged in a particularly space-saving manner, is required for fastening the scanning plate on a support. A compact structure of the scanning unit, and therefore of the position measuring device, is assured.

It is particularly advantageous if the scanning plate is fastened on a support by only two screws, wherein one screw constitutes the axis of rotation for pivoting the scanning plate in relation to the support, and the other screw constitutes the axis of rotation of the eccentric bushing. Following the end of adjustment, the two fastening screws are tightened. In the process, the eccentric bushing is clamped in the set position between the screw head and the support and is fixed in place in this way.

Further advantages, as well as details of the present invention ensue from the following description of exemplary embodiments by the attached drawings.

DETAILED DESCRIPTION OF THE PREFERRED EMBODIMENTS

Figure 1:
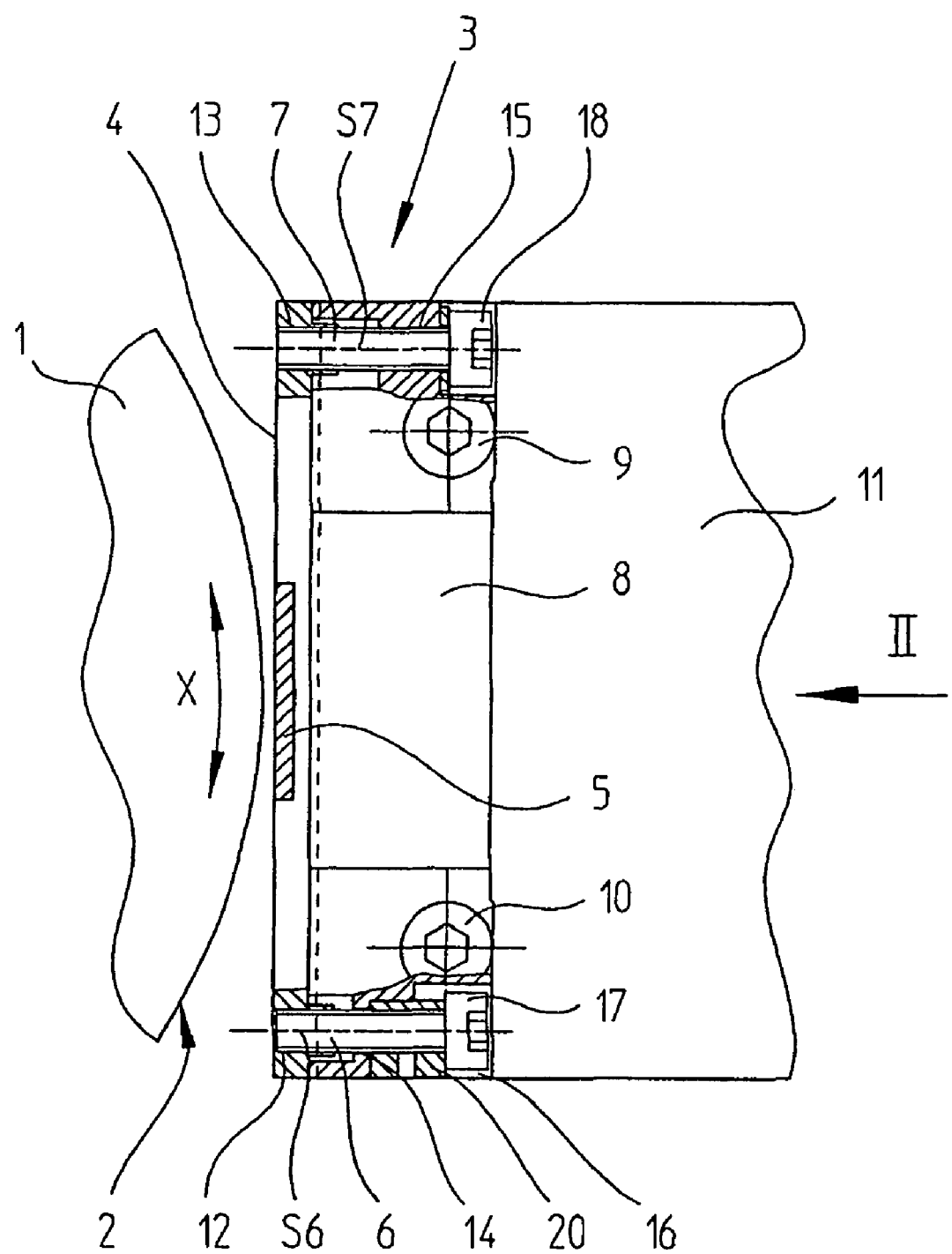
FIG. 1 shows an embodiment of a position measuring device with a drum-like graduation support and a scanning unit in a partial sectional view in accordance with the present invention.

The present invention will be explained by the example of an angle measuring device. This angle measuring device includes a drum-shaped graduation support 1. An incremental measuring graduation 2 has been applied to the circumference of this drum 1, which is scanned by a scanning unit 3 in order to form position-dependent electrical scanning signals. The scanning unit 3 has a scanning plate 4 for scanning the measuring graduation 2. In a known manner, the light from a light source of the scanning unit 3 is modulated as a function of the position of the measuring graduation 2, which is moved in the measuring direction X. The scanning plate 4 has a scanning graduation 5 matched to the measuring graduation 2. The scanning graduation 5 can be adjusted relative to the measuring graduation 2 in order to optimize the scanning signals, so that the graduation lines of the scanning graduation 5 can be brought into a preset orientation with respect to the graduation lines of the measuring graduation 2. To this end, the scanning plate 4 is fastened by two screws 6, 7 on a support 8. This support 8 in turn is fastened by several screws 9, 10 on a machine element 11 to be measured.

Each of the two screws 6, 7 has been screwed into a screw thread 12, 13 of the scanning plate 4 and protrudes through a through-hole 14, 15 of the support 8. The through-hole 15 has such dimensions that the screw 7 can be turned in it free of play. The scanning plate 4 is pivoted around the axis of rotation S7 by turning the eccentric bushing 20 (pivot movement V), in the process the shank of the screw 6 is displaced in the housing 8, for which purpose the through-hole 14 is embodied as an elongated hole with the longer extension in the direction of the pivot movement V. In the example shown, the support is the housing 8, which encloses the elements needed for scanning, such as the light source, light detectors and amplifiers, as well as evaluation units. The scanning plate 4 covers the opening of the housing 8.

Figure 2:
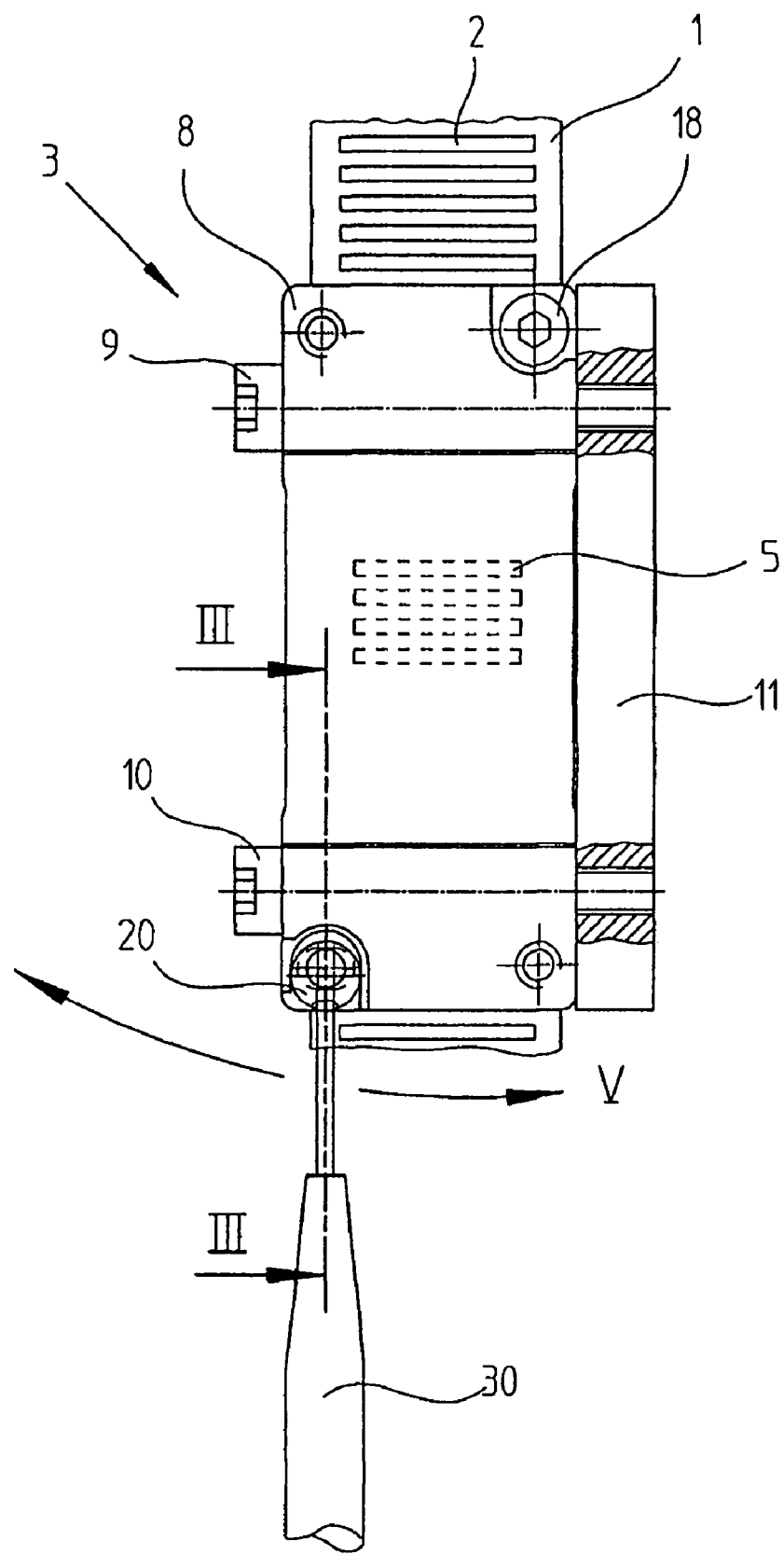
FIG. 2 is a plan view II of the scanning unit of the position measuring device in accordance with FIG. 1 (without the screw 6)
Figure 3:
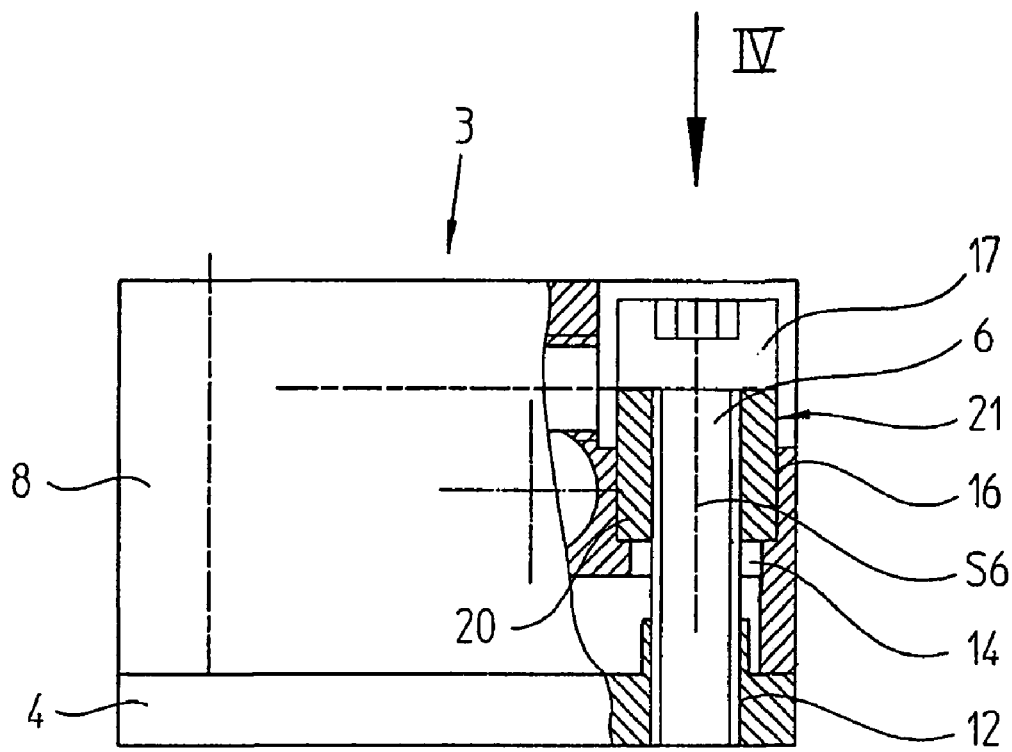
FIG. 3 is a partial sectional view III-III of the scanning unit in accordance with FIG. 2.
Figure 4:
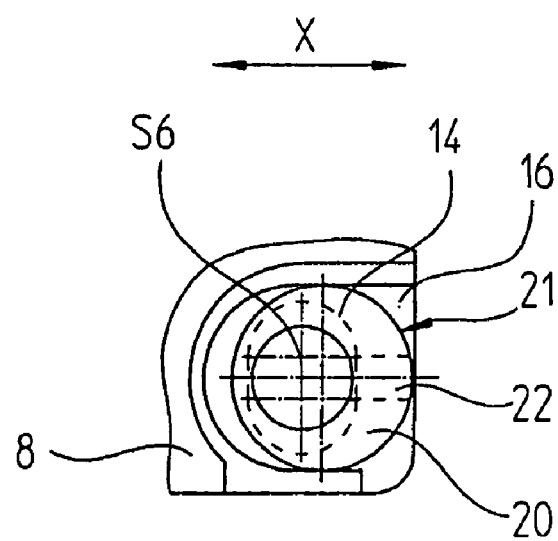
FIG. 4 shows enlarged portions of a plan view IV of the scanning unit in accordance with FIG. 3 without a screw.

As can be seen in FIGS. 2 and 3 in particular, the Moiré adjustment takes place by turning an eccentric bushing 20. This eccentric bushing 20 is seated, rotatable around the shank of the screw 6, and its eccentric circumferential surface 21 works together with a recess 16 of the support. This recess has the shape of an elongated hole 16, open on one side, as shown in the view from above in FIG. 4. A rotation of the eccentric bushing 20 around the screw axis S6 causes a displacement, which corresponds to the eccentricity of the eccentric bushing 20, of the screw 6 in the elongated hole 14. Since in this radial movement direction the screw 6 is connected free of play with the scanning plate 4 because of the engagement of the screw thread 12 with the scanning plate 4, this displacement is transferred to the scanning plate 4, which leads to a pivot movement V of the scanning plate 4 relative to the housing 8 around the axis of rotation S7 of the screw 7. The eccentric bushing 20 is arranged between the head 17 of the screw 6 and the housing 8. To make a displacement of the eccentric bushing 20 possible, both screws 6, 7 are slightly loosened. At the end of the adjustment, both screws 6, 7 are tightened, because of which the respective screw heads 17, 18 of the screws 6, 7 are supported on the housing 8 and pull the scanning plate 4 against the housing 8. Since the eccentric bushing 20 is arranged between the screw head 17 and the housing 8, it is solidly fixed in place in the adjusted position during the course of tightening the screw 6.

The eccentric bushing 20 has at least one recess extending transversely to the axis of rotation S6 for introducing a handle 30 for turning it.

The eccentric bushing 20 is advantageously made of a material with little surface friction in order to minimize friction between the eccentric bushing 20 and the housing 8, as well as between the eccentric bushing 20 and the screw head 17. Bronze, for example, is suitable as the material.

Using the fastening screw 6 as the axis of rotation S6 of the eccentric bushing 20, as well as using the fastening screw 7 as the axis of rotation S7 for pivoting the scanning plate 4, also has the advantage that the scanning unit 3 is compactly constructed and no components are present which could possibly interfere with installation on the machine element 11. Since access to the screws 6, 7 must be assured for tightly screwing the scanning plate 4 to the housing 8, access to the eccentric bushing 20 is also inevitably assured.

As already mentioned, the scanning plate 4 functions as a cover for the housing 8 and covers the scanning elements, such as the light source and the photodetectors. To this end, the scanning plate 4 is transparent at least in the scanning area and has the scanning graduation 5. The screws 6, 7 for fastening the scanning plate 4 are located at the corners or in the outer edge areas of the housing 8 and are therefore arranged spaced apart as far as possible from each other, from which the advantage of maximum step-down, and therefore a possible fine adjustment, results.

The present invention can be used in angle and linear measuring devices.

In place of the screws 6, 7 shown, it is also possible to employ threaded pins with screwed-on nuts as the fastening elements.

Further exemplary embodiments exist within the scope of the present invention besides the described examples.

I claim:

1. A scanning unit for scanning a measuring graduation, comprising:
a housing;
a light source arranged within a space of said housing;
scanning elements arranged within said space of said housing;
a scanning plate with a scanning graduation fastened on said housing by a first fastening element and a second fastening element, wherein said scanning plate closes off said space of said housing in which said light source and said scanning elements are arranged;
an eccentric element that can be rotated around a first axis of rotation and causes pivoting of said scanning plate with respect to said housing around a second axis of rotation, wherein said first axis of rotation is constituted by said first fastening element and said second axis of rotation is constituted by said second fastening element.

2. The scanning unit in accordance with claim 1, wherein said scanning plate is fastened on said housing solely by said first fastening element and said second fastening element.

3. The scanning unit in accordance with claim 2, wherein said first and second fastening elements are screws.

4. The scanning unit in accordance with claim 3, wherein said first fastening element is screwed into a screw thread of said scanning plate and protrudes through a through-hole of said housing.

5. The scanning unit in accordance with claim 3, wherein said eccentric element is an eccentric bushing that is seated, rotatable around a shank of said first fastening element, and whose eccentric circumferential surface acts together with a recess of said housing in order to cause a positional displacement of said first fastening element.

6. The scanning unit in accordance with claim 5, wherein said eccentric bushing is arranged between a head of said first fastening element and said housing and can be fixed in place by said first fastening element.

7. The scanning unit in accordance with claim 5, wherein said eccentric bushing has a recess extending transversely in relation to said first axis of rotation for introducing a handle.

8. A position measuring device comprising:
a graduation support supporting a measuring graduation; and
a scanning unit for scanning said measuring graduation, said scanning unit comprising:
a housing with a light source and scanning elements arranged within a space of said housing;
a scanning plate comprising a scanning graduation fastened on said housing by a first fastening element and a second fastening element, wherein said scanning plate covers said space of said housing in which said light source and said scanning elements are arranged; and
an eccentric element that can be rotated around a first axis of rotation and causes pivoting of said scanning plate with respect to said housing around a second axis of rotation, wherein said first axis of rotation is constituted by said first fastening element and said second axis of rotation is constituted by said second fastening element.

* * * * *